Patented Aug. 30, 1932

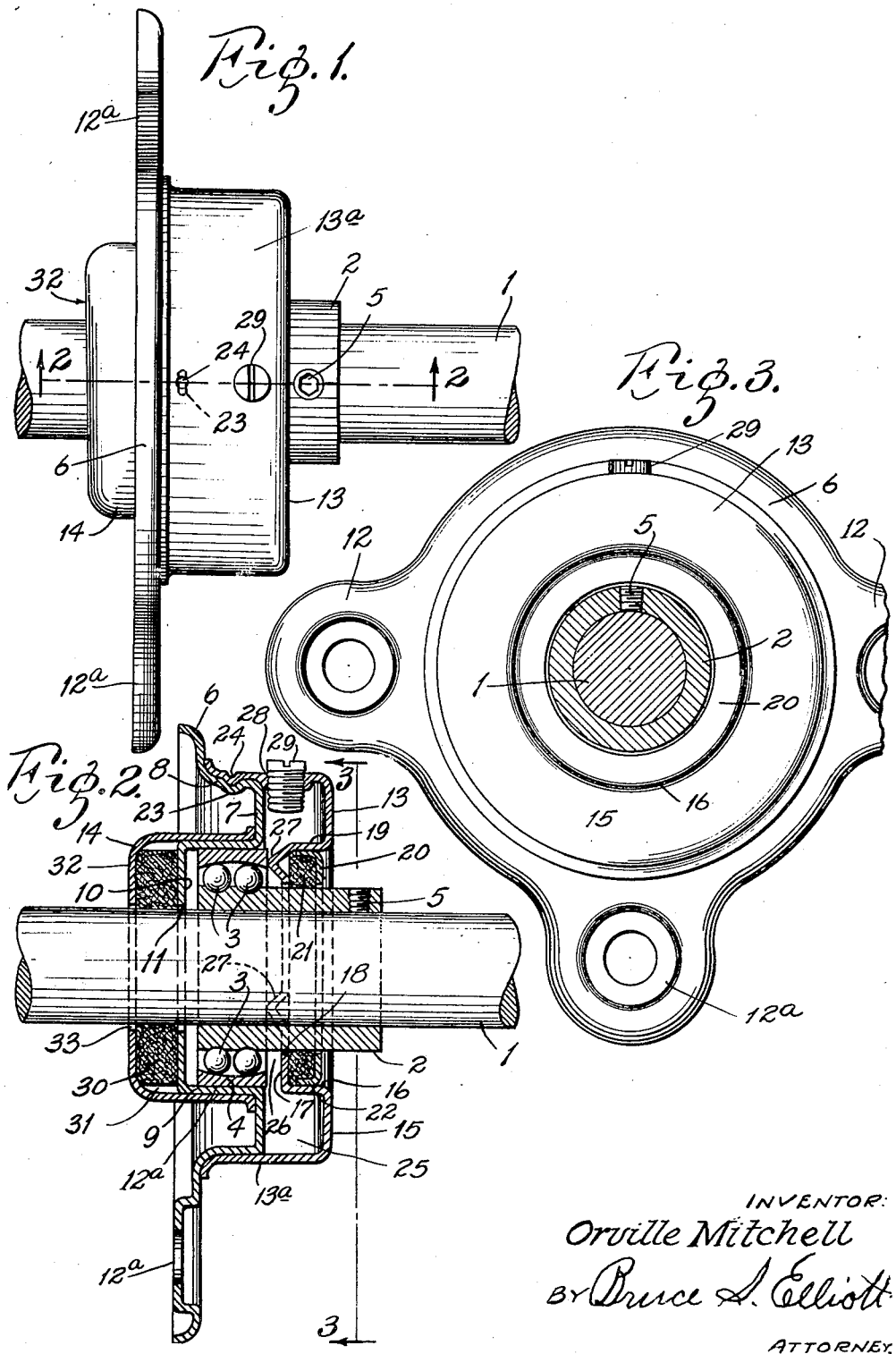

1,875,097

UNITED STATES PATENT OFFICE

ORVILLE MITCHELL, OF DALLAS, TEXAS, ASSIGNOR TO NORMA-HOFFMANN BEARINGS CORPORATION, OF STAMFORD, CONNECTICUT, A CORPORATION OF NEW YORK

BALL BEARING ASSEMBLY AND HOUSING THEREFOR

Application filed October 13, 1930. Serial No. 488,359.

This invention relates to a novel ball bearing assembly, and particularly to the housing thereof, the parts of which are formed of pressed steel.

A main object of the invention is to provide a bearing housing that will insure for the ball-bearing the most effective possible lubrication. Another object is to provide a housing which will enable the ball-bearing to be securely fitted therein without danger of exerting excessive pressure on the outer race and on the balls, which, in present constructions, frequently results in distorting the balls and causing them to wear out prematurely, or even to break.

Another object of the invention relates to the construction of certain parts of the housing, whereby, when assembled, these parts will provide an annular space forming a grease chamber surrounding the ball-bearing and providing an annular metering space through which the grease may pass to the ball-bearing.

An additional practical feature of my invention is the means which I provide for releasably, though securely, retaining the grease chamber in connection with the housing at the outer open side thereof, and the provision in the wall of said housing of an external recess surrounding a lateral extension of the inner race member of the bearing to receive a grease seal cooperating with said inner race member to effectually prevent leakage of the lubricant, and also exclude the entrance of dust and dirt to the interior of the bearing. This grease seal may be easily removed when necessary and replaced by a new seal without completely dismounting the bearing structure.

Finally, an important object of the invention resides in the construction of the parts of a housing for a ball-bearing of pressed steel, all the parts of which, including the ball-bearing to be housed, may be rapidly assembled and securely united together by frictional engagement of the respective parts with each other or, in other words, by a press fit. A complete ball-bearing assembly can thus be produced in far less time than is required to produce the conventional ball-bearing having a housing of cast metal. In addition, my improved housing can be more economically constructed than the ordinary cast metal housing, and while of great strength, is much lighter in weight than a cast metal housing.

The invention is illustrated in the accompanying drawing in which:

Fig. 1 is a plan view of a bearing assembly constructed according to my invention;

Fig. 2 is a sectional view thereof on the line 2—2 of Fig. 1; and

Fig. 3 is a cross-sectional view on the line 3—3 of Fig. 2.

Referring now to the drawing, the numeral 1 indicates a shaft mounted in a sleeve 2 providing the inner race for balls 3, which are surrounded by an outer race 4. The sleeve 2 is secured on shaft 1 to turn therewith, as by means of a set screw 5.

The ball-bearing is, as usual, mounted in a housing, and according to my invention the parts of this housing are formed of sheet steel, pressed into the desired shape, and capable of being assembled and permanently secured into position by being forced together into a press fit. This housing will now be described.

Referring more particularly to Fig. 2, the numeral 6 indicates the main body of the housing, which is formed of a single piece of sheet steel pressed or stamped to form a circular, annular portion 7, connecting an outer wall 8 and an inner cylindrical wall 9 at one end of the latter. At the other end of the inner wall 9, the body of the sheet of metal extends at right-angles to said wall, as indicated at 10, and is provided with a central aperture 11 through which the shaft 1 may pass. The ball-bearing is secured in position by being pressed into the housing, the outer race frictionally engaging the inner surface 12 of wall 9 to produce a press fit. When the bearing is pressed into the housing formed by the wall 9, the engagement of the outer race 4 with said inner surface will cause the wall 9, which is of sheet metal, to yield wherever necessary, and to such extent as is necessary to obtain a perfect fit between the bearing and its housing, the fit being neither loose enough to permit movement between them, or slapping, nor tight enough to make the race 4 lock or distort the balls 3.

The main body 6 is provided with means for attaching the bearing assembly to its support in a plane at right-angles to the wall 9, said means being preferably in the form of integral, apertured ears 12a.

A feature of the invention consists in the fact that the walls 8 and 9 connected by the part 7 constitute, respectively, supports for the outer cap 13 and the inner cap 14 of the bearing assembly. This arrangement and the purposes subserved thereby will now be described.

The outer cap 13 is stamped or pressed from a single piece of sheet steel. It is cylindrical in form having a cylindrical outer wall 13a extending inwardly at right-angles to its body portion constituting the head or outer end 15 of the cap. The head 15 of the cap is provided with a central circular recess 16, the bottom wall 17 of which is provided with a circular aperture 18 to surround the sleeve 2. The wall 19 of recess 16 extends inwardly, relative to the assembled position of the cap as shown in Fig. 2, at right-angles to the outer end 15 thereof, and provides a seat for a retaining ring 20 which acts in conjunction with the bottom 17 of said recess to inclose a felt or other type of grease seal 21, which is in the form of an annulus fitting closely upon the periphery of the sleeve 2. When pressed into recess 16 the outer wall 22 of retaining ring 20 forms a press fit with the inner surface of wall 19 of the recess and will be securely held in position.

The wall 13a of cap 13 projects inwardly a considerable distance beyond the bottom 17 of recess 16, and in assembling the parts the outer end portion of this wall is forced over the outer wall 8 of the housing plate 6 to form a press fit therewith. If desired, the outer wall 8 may be provided with one or more indentations 23 to receive a corresponding boss, or bosses 24, on wall 13a when the cap is forced into place. When positioned as described on the main body 6, the outer end of cap 13 will extend parallel with the part 7, providing an annular space 25, which forms a grease chamber substantially surrounding the ball-bearing, as clearly shown in Fig. 2. At the same time the bottom wall 17 of recess 16 will be positioned a short distance from and in parallel relation to the outer side of the outer race 4, providing a metering space 26, through which grease may pass from the chamber 25 to the ball-bearing. The width of this metering space is maintained uniform, and at the same time the center of cap 13 held rigidly in position by means of bosses 27, a plurality of which are formed on the wall 17 of the cap and bear against the outer side of the outer race 4, as shown. The grease chamber 25 is provided with grease through an opening 28 provided in the wall 14 of cap 13 and which is normally closed by a screw 29.

At the rear of the assembly, the wall 10 of the main body 6 forms a seat for a felt or other type of grease seal 30, which is mounted in a space 31 provided between the wall 10 of the main body 6 and the end wall 32 of the inner cap 14, previously referred to. This wall is provided with a central aperture 33 for receiving shaft 1. The cap 14, like cap 13, is pressed or stamped from a single sheet of steel to have the cup shape shown, forming the end wall 32 and a cylindrical portion 34, the inner surface of which provides a bore of approximately the diameter of the outside diameter of the inner wall 9 of the main body 6, so that when cap 14 is forced over the wall 9 it will form a press fit therewith and be securely held in position.

From the above, it will be seen that I have produced a unitary assembly embodying the anti-friction bearing, its housing, a lubricant supply chamber, and a lubricant seal which may be easily handled and applied and mounted in proper position upon the supporting wall structure to receive the shaft. Since the open side of the bearing housing and the cap member 13 forming the lubricant receiving chamber are disposed at the outer side of the supporting wall, when access to the bearing is necessary for any reason, this cap can be readily removed without dismounting the bearing housing. Also, by the arrangement of the grease seal 21 in an external recess formed in the wall of the cap 13, when the felt sealing gasket becomes unduly worn, it may be readily removed and replaced by a new one. Further, by reason of this construction, the bearing manufacturer may supply the assembly including the housing and the caps 13 and 14 to the purchaser and the latter may then pack the chamber 25 with the grease or lubricant and apply the seal 21.

From an inspection of Fig. 2, it will be seen that the grease has only one path of escape from the grease chamber 25, and that is the metering space 26, and as this metering space surrounds the ball-bearing, it follows that all of the grease must pass by the ball-bearing before any of it can possibly escape from the housing. It will further be noted as to this arrangement, that as long as there is any lubricant at all in chamber 25 there will always be some in the metering space 26, and therefore the bearing will always be properly lubricated.

This arrangement constitutes a radical departure from prior constructions in that, in the latter, a portion of the grease can pass to the bottom of the grease chamber beyond the inner race and remain dormant, or else escape past the seal without lubricating the bearing. Such results, as explained above, are impossible with the present construction.

I claim:

1. A pressed steel housing for ball bearings comprising a body portion having an outer and an inner wall, the inner wall surrounding a ball-bearing recess and having a portion providing a bottom wall for said recess, a rear cap having a press fit with the inner wall of said housing and forming with the bottom wall of said recess a space for receiving a grease seal, and a front cap having a press fit on the outer wall of said housing and provided with an inwardly-extending circular depression forming a recess for receiving a sealing element, the portion of said cap beyond said depression forming with said extrusion an annular space constituting a grease chamber surrounding the recess for the ball bearing, and the bottom of said depression forming with said housing a metering space for the passage of grease from said chamber.

2. A pressed steel housing for ball bearings comprising a body portion having an outer and an inner wall, the inner wall surrounding a ball-bearing recess, and a front cap having a press fit on the outer wall of said housing and provided with an inwardly-extending circular depression forming a recess for receiving a sealing element, the portion of said cap beyond said depression forming with said housing an annular space constituting a grease chamber surrounding the recess for the ball bearing, and the bottom of said depression forming with said housing a metering space for the passage of grease from said chamber and being provided with a series of spacing bosses.

3. A ball bearing assembly comprising, in combination with a pressed steel housing having an outer and an inner wall, the inner wall surrounding a circular recess, a ball bearing having a sleeve providing at one end an inner race, and having an outer race seated in said recess, and a front cap having a press fit on the outer wall of said housing and providing therewith an annular space constituting a grease chamber surrounding the ball-bearing, said cap having a circular, inwardly-extending depression the bottom whereof is apertured forming with said housing and said outer race a metering space for the passage of grease from said chamber directly past and in contact with said ball bearing, and a sealing element mounted in said depression.

4. A bearing structure comprising a housing, a bearing therein having an inner race member projecting laterally beyond the open side of the housing, an annular grease receiving chamber surrounding the bearing at the open side of the housing and in communication therewith, the wall of said chamber having an external recess surrounding the projecting part of the inner bearing member, and sealing means in said recess engaged with said bearing member.

5. A bearing structure comprising a housing, a bearing therein having an inner race member projecting laterally beyond the open side of the housing, a cap member of annular channel shape form providing a grease holding chamber, and means for detachably retaining said cap in attached relation to the housing with the chamber thereof in communication with the interior of said housing, and said cap having an inner cylindrical wall spaced from the projecting part of the inner race member and cooperating therewith to form an external recess adapted to receive a sealing means for said grease holding chamber.

6. A bearing structure comprising a housing and means for mounting the same on a supporting wall, the outer end of said housing being open, a bearing fitted within said housing including an inner race member projecting laterally beyond the open side of the housing, an annular lubricant receiving chamber, and means for detachably retaining said chamber in fixed relation to the housing and in communication with the open side thereof, and an externally accessible grease seal interposed between the wall of said chamber and the projecting part of the inner bearing member.

7. A bearing structure comprising a housing open at one side and having inner and outer spaced walls, a bearing fitted within said housing and including an inner race member projecting laterally beyond the open side of the housing, and a cap for the open side of the housing having a part receiving the outer wall of the housing, said cap also having a central opening to receive said inner race member and provided adjacent thereto with an annular recess opening on the outer side of the cap to receive a lubricant sealing ring.

8. A bearing structure comprising a housing, a ball bearing fitted therein, an annular grease receiving chamber, and means for detachably retaining said chamber in assembled relation with the housing, the inner cylindrical wall of said chamber being radially extended inwardly in spaced relation from the open side of the housing and having spaced parts thereof in bearing contact against the outer race member of the anti-friction bearing, and forming a communicating channel between said chamber and the interior of the housing.

In testimony whereof, I have hereunto set my hand.

ORVILLE MITCHELL.